May 1, 1945. R. C. WORLEY 2,374,849
COMBINED MICROMETER AND CRANK GRINDING TOOL
Filed Nov. 6, 1944 2 Sheets-Sheet 1
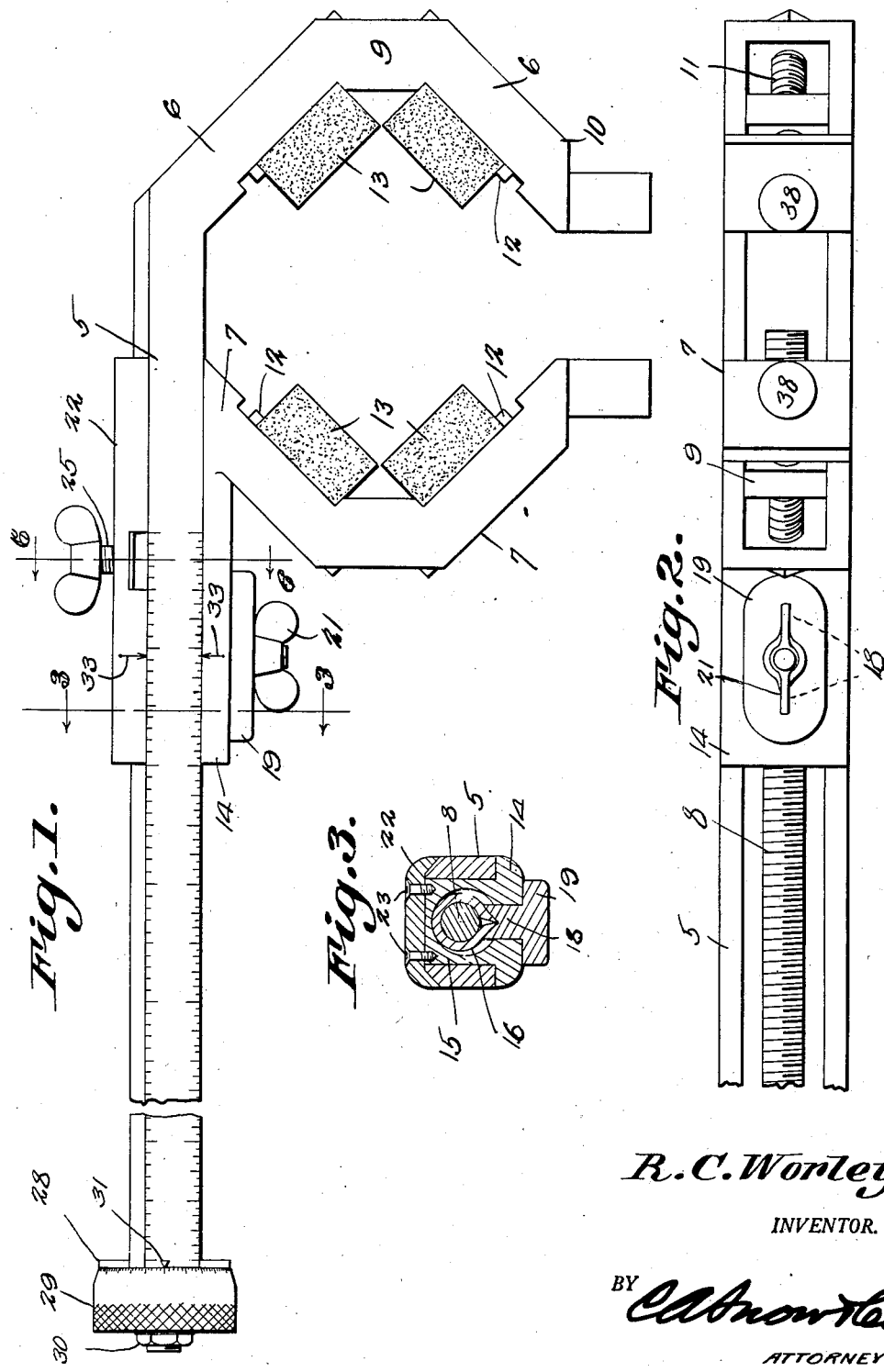
R. C. Worley
INVENTOR.
BY *[signature]*
ATTORNEYS.

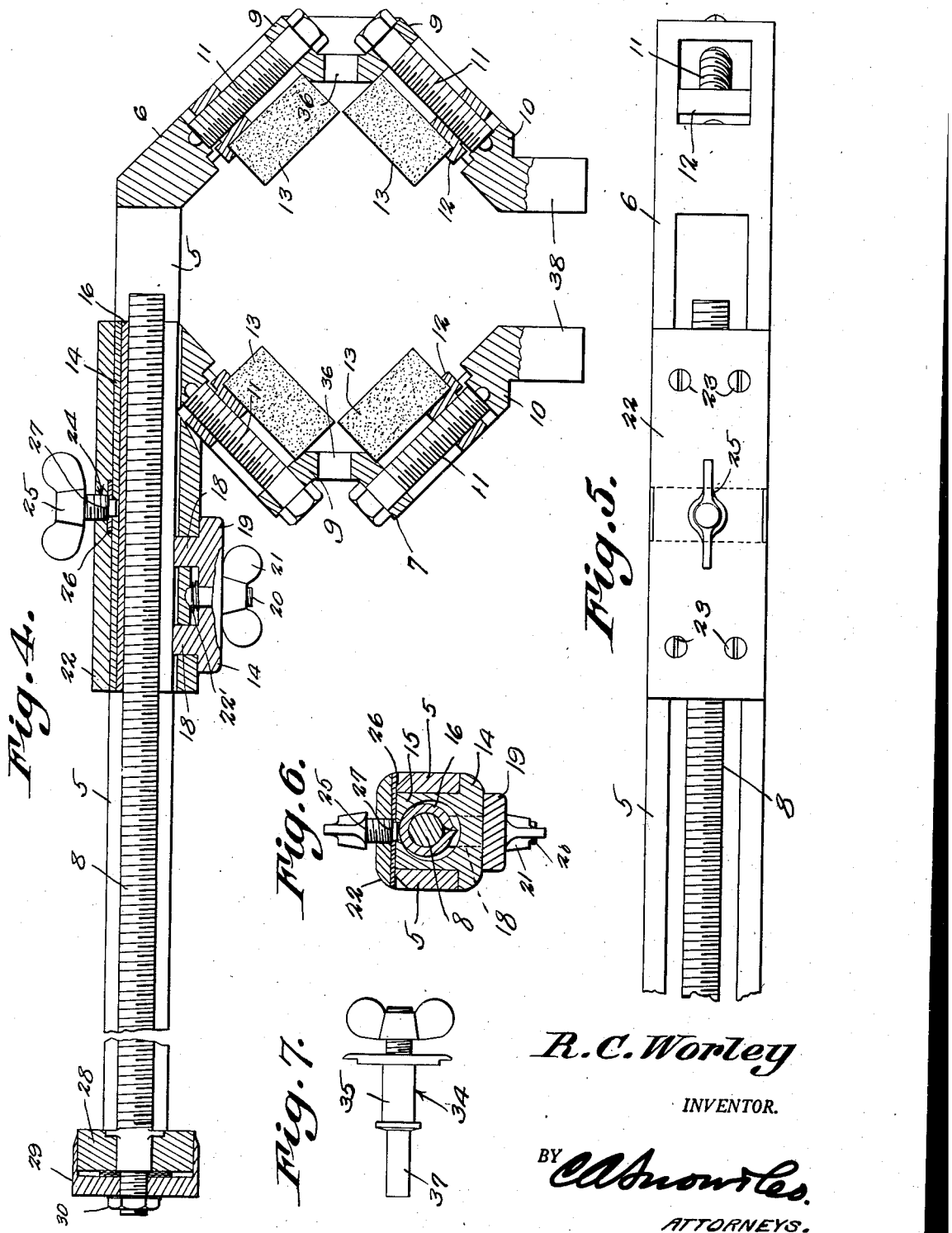

Patented May 1, 1945

2,374,849

UNITED STATES PATENT OFFICE 2,374,849

COMBINED MICROMETER AND CRANK GRINDING TOOL

Robert C. Worley, Huntsville, Ala.

Application November 6, 1944, Serial No. 562,145

5 Claims. (Cl. 51—205)

This invention relates to a combination hand tool, designed for use in grinding and resurfacing crank shafts, cleaning piston ring grooves, and at the same time provide a tool which may be used as a micrometer in gauging inner and outer diameters of cylindrical objects.

An important object of the invention is to provide a hand tool of this character wherein the movable jaw thereof may be readily slid along the shank of the stationary jaw and then accurately adjusted for precision grinding.

Still another object of this invention is to provide a tool which may be positioned and operated from a point under the motor, eliminating the necessity of removing the crank shaft from the motor block to recondition the same.

Another object of the invention is to provide a tool wherein the threaded shank employed in operating the moveable jaw of the tool may be securely gripped and held against movement in such a way, after an adjustment has been made, that any possibility of the threads becoming distorted to impair the accuracy of the tool will be eliminated.

With the foregoing and other objects in view, which will appear as the description proceeds, the invention consists of certain details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a tool constructed in accordance with the invention.

Figure 2 is a front elevational view of the tool.

Figure 3 is a sectional view taken on line 3—3 of Figure 1.

Figure 4 is a longitudinal sectional view through the tool.

Figure 5 is a fragmental rear elevational view of the tool.

Figure 6 is a sectional view taken on line 6—6 of Figure 1.

Figure 7 is a view illustrating a removable knife or blade carried by one of the jaws of the tool, for cleaning the ring grooves of pistons.

Referring to the drawings in detail, the handle or shank of the tool is indicated by the reference character 5 and has, at its outer end, a stationary jaw 6. The handle or shank has open sides, so that the movable jaw indicated by the reference character 7 may slide over the handle or shank and be controlled by the screw 8 mounted within the handle.

The stationary jaw 6 is also formed with open sides, and is provided with cross pieces 9 and 10, which are formed with openings to receive the threaded adjusting bolts 11.

Jaws 12 are carried by the jaws of the tool proper and are formed with threaded bores that accommodate the threaded adjusting bolts 11, whereby the jaws 12 may be adjusted to grip the abrading blocks 13, which may be in the form of stones or files.

The movable jaw 7 is also provided with a shank 14, which is provided with a reduced portion 15, fitted within the shank 5, the reduced portion being formed with an enlarged bore in which the screw 8 is positioned, the bore being appreciably larger than the diameter of the screw 8, as clearly shown by the drawings. Positioned within the bore of the reduced portion is a split sleeve 16, which is provided with internal threads adapted to cooperate with the threads of the screw 8. As shown, the split sleeve is provided with integral parallel flanges 17 that are received in the V-shaped ends of the extensions 18 formed on the member 19, which is shown as positioned on the shank 14, the shank 14 having spaced openings to receive the extension 18. The member 19 is also formed with a central opening so that it may be positioned over the threaded shank 20 and held in position by means of the winged nut 21, positioned thereon. The coiled spring 22' mounted on the shank 20 bears against member 19 and normally urges the member 20 outwardly. Due to this construction, it will be seen that when the winged nut is tightened the extensions will be forced inwardly, and the V-shaped ends thereof will move over the flanges 17, causing the split sleeve to grip the threads of the screw 8. It will be understood that the outer surfaces of the flanges 17 are slightly beveled, so that a camming action is set up between the V-shaped ends of the extensions and flanges when the member 19 is forced inwardly.

A removable plate 22, which is of a length equal to the length of the reduced portion 15 of the shank of the movable jaw, is secured to the reduced portion 15 by means of the screws 23, and portions of this removable plate contact with one side of the shank 5 of the stationary jaw, securing the movable jaw and its shank to the shank of the stationary jaw. A threaded opening 24 is formed in the plate 22, which opening accommodates the wing-headed screw 25 that is formed with a reduced end, which extends through the plate 26, a shoulder 27 being provided adjacent to the end of the screw 25 that engages the plate 26 to move the plate 26 into frictional engagement with the reduced portion 15 of the shank 14, as shown by Figure 6 of the drawings. The inner end of the screw 25 engaging the split sleeve 16 towards the sleeve 16 into engagement with the screw 8.

The screw 8 has one of its ends extended through an opening in the end 28 of the handle or shank 5, and to this end of the screw is secured the thimble 29 by means of the nut 30. This thimble 29 is formed with graduations that fall opposite to the indicator 31, so that rotary movement of the thimble may be accurately gauged to control the operation of the screw 8, which moves the movable jaw of the tool with respect to the stationary jaw thereof. Graduations are formed along the handle or shank 5, as shown by Figure 1 of the drawings, the latter graduations cooperating with the arrows 33 formed on the shank of the movable jaw, so that the movable jaw may be moved accurately to adjust the tool for precision grinding.

As shown by Figure 7 of the drawings, the reference character 34 designates a piston ring groove cleaning member which embodies a square shank 35, adapted to be fitted in the opening 36 of either the stationary jaw or movable jaw of the tool, each blade comprising a reduced end 37 of a width to fit within the usual piston ring groove of a piston. In many cases it may be desirable to position a member 34 in each of the openings 36 to accomplish the cleaning operation.

In the use of the tool as a crank shaft grinding or finishing tool, abrasive stones or files are positioned between the adjustable jaws 12 of the tool, and secured in position. The tool is then positioned over the crank shaft to be ground, and the thimble 29 moved to operate the screw 8, resulting in the abrasive elements of the tool being moved into contact with the shaft. The handle of the tool may now be rocked in a suitable manner to accomplish the grinding or refinishing operation.

An extension, indicated at 38, is formed on each of the main jaws of the tool, and these extensions may be positioned over or within cylindrical objects, and the tool used as a micrometer.

When the tool is used as a micrometer, the readings may be taken from the graduations and indicators shown on the tool, as previously described.

What is claimed:

1. A tool of the class described, comprising a stationary jaw, a shank extending from the jaw, a jaw mounted for sliding movement on the shank of the stationary jaw, a shank formed integral with the movable jaw, an operating screw mounted on the shank of the stationary jaw and extending through the shank of the movable jaw and adapted to move the movable jaw with respect to the stationary jaw, a threaded expansible sleeve loosely fitted over the screw, means for moving the sleeve into engagement with the screw, securing the movable jaw and screw against movement, and abrasive members secured within the jaws.

2. A quick acting tool of the class described, comprising a stationary jaw, a shank extending from the stationary jaw, a movable jaw mounted for sliding movement on the shank, an operating screw mounted within the shank and adapted to move the movable jaw with respect to the stationary jaw, and means for disconnecting the operating screw and movable jaw, whereby the movable jaw may be moved longitudinally of the shank independently of the operating screw, and abrading members mounted on the jaws of the tool.

3. A quick acting grinding tool comprising a stationary jaw, including a shank, an operating screw disposed within the shank, a movable jaw including a shank, operating on the shank of the stationary jaw, an operating screw operating within the shank of the stationary jaw, an internally threaded expansible sleeve mounted on the operating screw and being disposed within the shank of the movable jaw, means for moving the expansible sleeve into engagement with the operating screw, connecting the movable jaw and operating screw, and abrasive members secured within the jaws of the tool.

4. A quick acting grinding tool comprising a stationary jaw, including a shank, an operating screw disposed within the shank, a movable jaw operating over the shank of the stationary jaw, means for connecting the movable jaw and operating screw whereby movement of the operating screw adjusts the movable jaw with respect to the stationary jaw, adjustable jaws mounted on the stationary jaw and movable jaw of the tool, and abrasive members secured in position on the tool by the last mentioned jaws.

5. A quick acting grinding tool comprising a stationary jaw, including a shank, an operating screw disposed within the shank, a movable jaw operating on the shank of the stationary jaw, said operating screw extending into the shank of the movable jaw, means for connecting the shank of the movable jaw with the operating screw whereby movement of the operating screw moves the movable jaw with respect to the stationary jaw, said connecting means adapted to be disengaged with the operating screw whereby the movable jaw may slide independently of the operating screw, and abrasive blocks mounted on the jaws of the tool.

ROBERT C. WORLEY.